(12) United States Patent
Ore

(10) Patent No.: US 6,257,082 B1
(45) Date of Patent: Jul. 10, 2001

(54) AUXILIARY SECTION CONTROL FOR MANUAL TRANSMISSION

(75) Inventor: Thomas G. Ore, Kalamazoo, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/523,743

(22) Filed: Mar. 13, 2000

(51) Int. Cl.$^7$ .............................. F16H 59/00; B60K 41/02
(52) U.S. Cl. ............................................. 74/336 R; 477/79
(58) Field of Search .......................... 74/336 R; 477/79, 477/80, 908

(56) References Cited

U.S. PATENT DOCUMENTS

| | | | |
|---|---|---|---|
| 5,263,379 | 11/1993 | Newbigging et al. | 74/336 |
| 5,370,013 | 12/1994 | Reynolds et al. | 74/330 |
| 5,471,893 | 12/1995 | Newbigging | 74/335 |
| 5,537,894 | * 7/1996 | Chan | 74/336 R |
| 5,661,998 | 9/1997 | Genise | 74/335 |
| 5,673,592 | 10/1997 | Huggins et al. | 74/336 |
| 5,735,771 | * 4/1998 | Genise | 477/111 |
| 5,737,969 | 4/1998 | Braun et al. | 74/477 |
| 5,743,143 | 4/1998 | Carpenter et al. | 74/335 |
| 5,893,292 | 4/1999 | Lanting | 74/335 |
| 5,899,121 | 5/1999 | Mulvihill et al. | 74/745 |
| 5,911,787 | 6/1999 | Walker | 74/335 |
| 5,950,491 | 9/1999 | Wadas | 74/335 |
| 5,964,121 | * 10/1999 | Steeby et al. | 74/336 R |
| 5,974,906 | * 11/1999 | Stine et al. | 74/336 R X |
| 6,015,366 | * 1/2000 | Markyvech et al. | 74/335 X |
| 6,042,504 | * 3/2000 | Gualtieri et al. | 74/336 R X |
| 6,105,449 | * 8/2000 | Genise et al. | 74/335 |

FOREIGN PATENT DOCUMENTS

99/31409  6/1999  (WO).

* cited by examiner

Primary Examiner—Charles A. Marmor
Assistant Examiner—Roger Pang
(74) Attorney, Agent, or Firm—Howard D. Gordon

(57) ABSTRACT

A control method/system for controlling range section (14) shifting in a range-type transmission (10) having a "repeat-H" (200) or "double-H" (202) shift mechanism. Under certain conditions, a shift into an operator-selected target ratio ($GR_T$) is unacceptable and a shift into an alternate ratio ($GR_{ALT}$) is implemented. The alternate ratio is a ratio available at an operator-selected main transmission position (1/5, 2/6, 3/7, 4/8) with the range section in a range ratio not selected by the operator.

16 Claims, 9 Drawing Sheets

AUXILIARY SECTION CONTROL FOR MANUAL TRANSMISSION

BACKGROUND OF THE INVENTION

1. Field of the Invention

The present invention relates to a range and/or range-and-splitter shift control for a manually shifted, range-type compound transmission. In particular, the present invention relates to an automatic override for a manually shifted, range-type transmission which, at certain vehicle speeds, will prevent inadvertent shifts into prohibited ratios.

2. Description of the Prior Art

Vehicular compound transmissions of the range type, including the combined splitter-and-range type, are well known in the prior art and may be seen by reference to U.S. Pat. Nos. 4,754,665; 5,370,013; 5,737,969 and 5,950,491, the disclosures of which are incorporated herein by reference. Manually shifted, range-type transmissions typically used either a "double-H" type shift pattern wherein range shifting was automatic, or a "repeat-H" type shift pattern wherein the driver is required to manually operate a range selector, usually a button or switch located on the shift knob assembly. Typical "double-H" shift range shift mechanisms may be seen by reference to U.S. Pat. Nos. 5,661,998 and 5,911,787, while typical "repeat-H" shift mechanisms may be seen by reference to U.S. Pat. No. 5,899,121, the disclosures of all of which are incorporated herein by reference. Transmissions with manually or automatically controlled splitter shifting are also known in the prior art, as may be seen by reference to U.S. Pat. Nos. 5,435,212 and 6,015,366, the disclosures of which are incorporated herein by reference.

Synchronized transmissions and transmissions utilizing enhanced synchronizers, such as boosted synchronizers, self-engaging synchronizers, double- or triple-cone synchronizers and/or synchronizers activated through various assist mechanisms, are known in the prior art and may be seen by reference to U.S. Pat. Nos. 5,588,516; 5,713,447; 5,738,194 and 5,738,196, the disclosures of which are incorporated herein by reference.

Shift assist systems which include a splitter clutch retained in neutral while the main section is shifted to reduce inertia on the main section synchronizers and/or jaw clutches are also known in the prior art, as may be seen by reference to U.S. Pat. Nos. 5,974,906; 5,904,068; 5,661,998; 5,651,292 and allowed Ser. No. 09/346,381, the disclosures of which are incorporated herein by reference While transmission systems utilizing such enhanced synchronizers and/or shift assist systems are effective to reduce the force required to shift a heavy-duty transmission, they also may permit engagement of ratios which are inappropriate for existing vehicle operating conditions.

The prior art also includes devices which will block inappropriate shifts (see U.S. Pat. No. 5,471,893 and WO 99/31409) and which will cause automatic range shifting as a function of vehicle speed (see U.S. Pat. Nos. 5,263,379 and 5,673,592).

These prior art devices were not totally satisfactory, as they were complicated and/or expensive and/or unduly restricted operator selection of ratios and/or could result in an undesirable transmission-neutral condition.

SUMMARY OF THE INVENTION

In accordance with the present invention, the drawbacks of the prior art are minimized or overcome by provision of a range or combined range and-splitter shift control for a range-type, manually shifted transmission, which requires a minimal amount of added components and which, for particular main section ratios, will prevent inadvertent selection and engagement of overall transmission ratios, which could result in unacceptable vehicle operating conditions and/or catastrophic damage to the transmission, and will cause an acceptable, or at least a more acceptable, overall transmission ratio to be engaged.

The foregoing is accomplished by sensing the position of the shift lever in the shift pattern and the engaged or selected auxiliary section ratios and, if the operator attempts a shift to an overall transmission ratio which is unacceptable, automatically causing a shift to the range, splitter and/or range-and-splitter ratio which will result in an acceptable overall transmission ratio for the selected main section ratio position, regardless of the positions of the manually operated range and/or splitter selector devices.

Accordingly, it is an object of the present invention to provide a range or a combined range-and-splitter shift control for a manually shifted, range-type transmission, which will prevent engagement of a potentially undesirable and/or catastrophic transmission ratio.

This and other objects and advantages of the present invention will become apparent from a reading of the following description of the preferred embodiment taken in connection with the attached drawings.

DESCRIPTION OF THE PREFERRED EMBODIMENT

Figure 1:
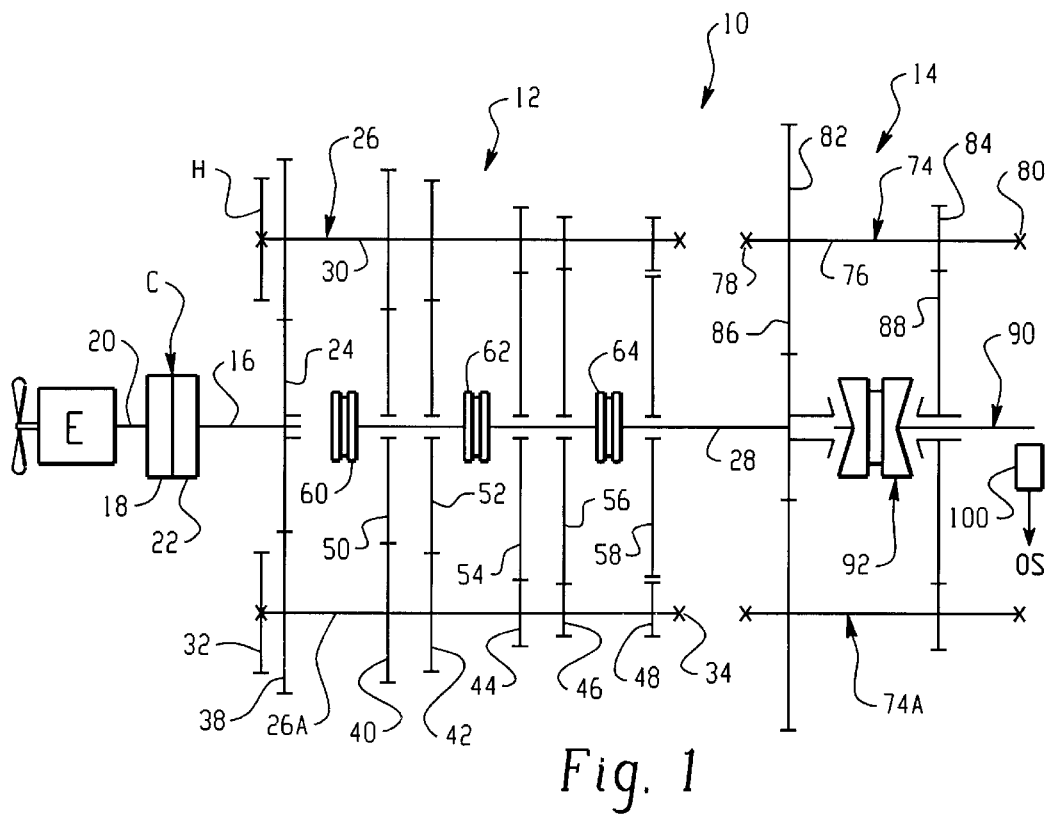
FIG. 1 is a schematic illustration of a compound transmission having a range-type auxiliary section and utilizing the range section control according to the present invention.
Figure 1A:
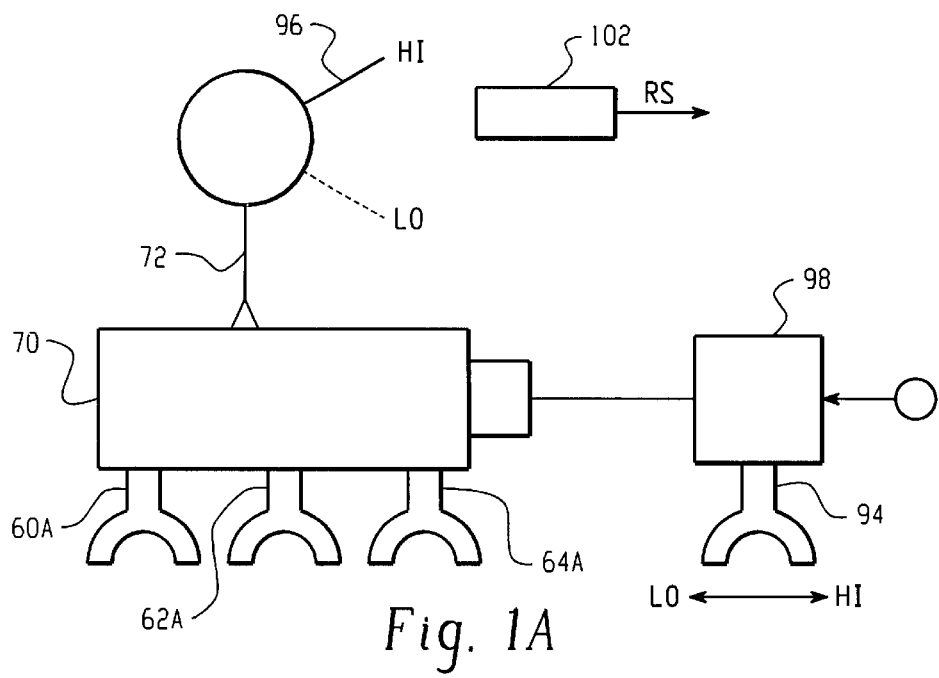
FIG. 1A is a schematic illustration of the shifting mechanism of the transmission of FIG. 1.

The term "compound transmission" is used to designate a change-speed or change-gear transmission having a multiple-forward-speed main transmission section and a multiple-speed auxiliary transmission section connected in series whereby a selected gear reduction in the main transmission section may be compounded by further selected gear reduction in the auxiliary transmission section. "Synchronized clutch assembly" and words of similar import designate a positive, jaw-type clutch assembly utilized to non-rotationally couple a selected gear to a shaft by means of a positive clutch in which attempted engagement of the clutch is prevented until the members of the clutch are at a substantially synchronous rotation.

Relatively large-capacity friction means are utilized with the clutch members and are sufficient, upon initiation of a clutch engagement, to cause the clutch members and all members rotating therewith to rotate at substantially synchronous speed.

As is well known and as may be seen by reference to aforementioned U.S. Pat. No. 4,754,665, auxiliary transmission sections are of three general types: range type, splitter type or combined range/splitter type. In compound transmissions having a range-type auxiliary section, the range step or steps are greater than the total ratio coverage of the main transmission section and the main section is shifted progressively through its ratios in each range. In compound transmissions having a splitter-type auxiliary section, the ratio steps of the splitter auxiliary section are less than the ratio steps of the main transmission section, and each main section ratio is split, or subdivided, by the splitter section. In a compound range-and splitter-type auxiliary section or sections, both range- and splitter-type ratios are provided, allowing the main section to be progressively shifted through its ratios in at least two ranges and also allowing the main section ratios to be split in at least one range.

A range-type transmission 10 utilizing the range shift control of the present invention may be seen by reference to FIGS. 1, 1A, 1B and 1C and 1D. Compound transmission 10 comprises multiple-speed main transmission section 12 connected in series with a range-type auxiliary section 14. Transmission 10 is housed within a housing H and includes an input shaft 16 driven by an engine, such as a diesel engine E, through a selectively disengaged, normally engaged, master clutch C having an input or driving portion 18 drivingly connected to engine crankshaft 20 and a driven portion 22 rotatably fixed to the transmission input shaft 16.

In main transmission section 12, input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28, which is generally coaxially aligned with input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48 fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 also may be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70, as is well known in the prior art. Clutch collars 60, 62 and 64 may be of the well-known synchronized or non-synchronized, double-acting jaw clutch type.

Mainshaft gear 58 is the reverse gear and is in continuous meshing engagement with countershaft gears 48 by means of conventional intermediate idler gears (not shown). While main transmission section 12 does provide five selectable forward speed ratios, the lowest forward speed ratio, namely that provided by drivingly connecting mainshaft drive gear 56 to mainshaft 28, is often of such a high gear reduction that it has to be considered a low or "creeper" gear, which is utilized only for starting of a vehicle under severe conditions and is not usually utilized in the high transmission range. Accordingly, while main transmission section 12 does provide five forward speeds, it is usually referred to as a "4+1" main section, as only four of the forward speeds are compounded by the auxiliary range transmission section 14.

Jaw clutches 60, 62 and 64 are three-position clutches in that they may be positioned in the centered, non-engaged position as illustrated, or in a fully rightwardly engaged or fully leftwardly engaged position by means of a shift lever 72. As is well known, only one of the clutches 60, 62 and 64 is engageable at a given time, as main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86, which is fixed for rotation with mainshaft 28.

Auxiliary section countershaft gears 84 are constantly meshed with output gear 88, which surrounds transmission output shaft 90.

A two-position, synchronized jaw clutch assembly 92 is axially positioned by means of shift fork 94 and the range section shifting actuator assembly 96. Jaw clutch assembly 92 is provided for clutching either gear 88 to output shaft 90 (for low range operation), or gear 86 to output shaft 90 (for direct or high range operation).

Figure 1B:
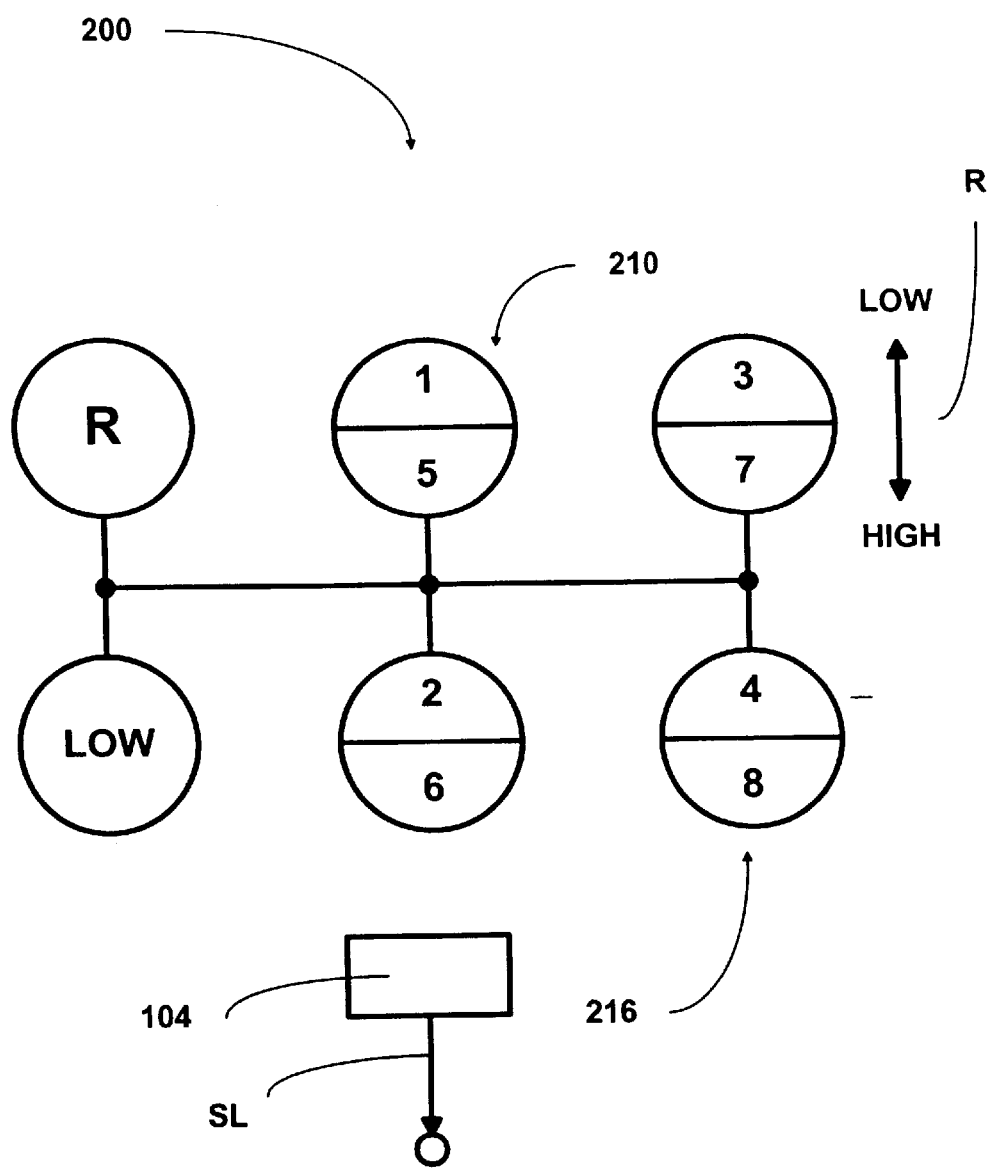
FIG. 1B is a schematic illustration of a "repeat-H" type shift pattern for the transmission of FIG. 1.
Figure 1C:
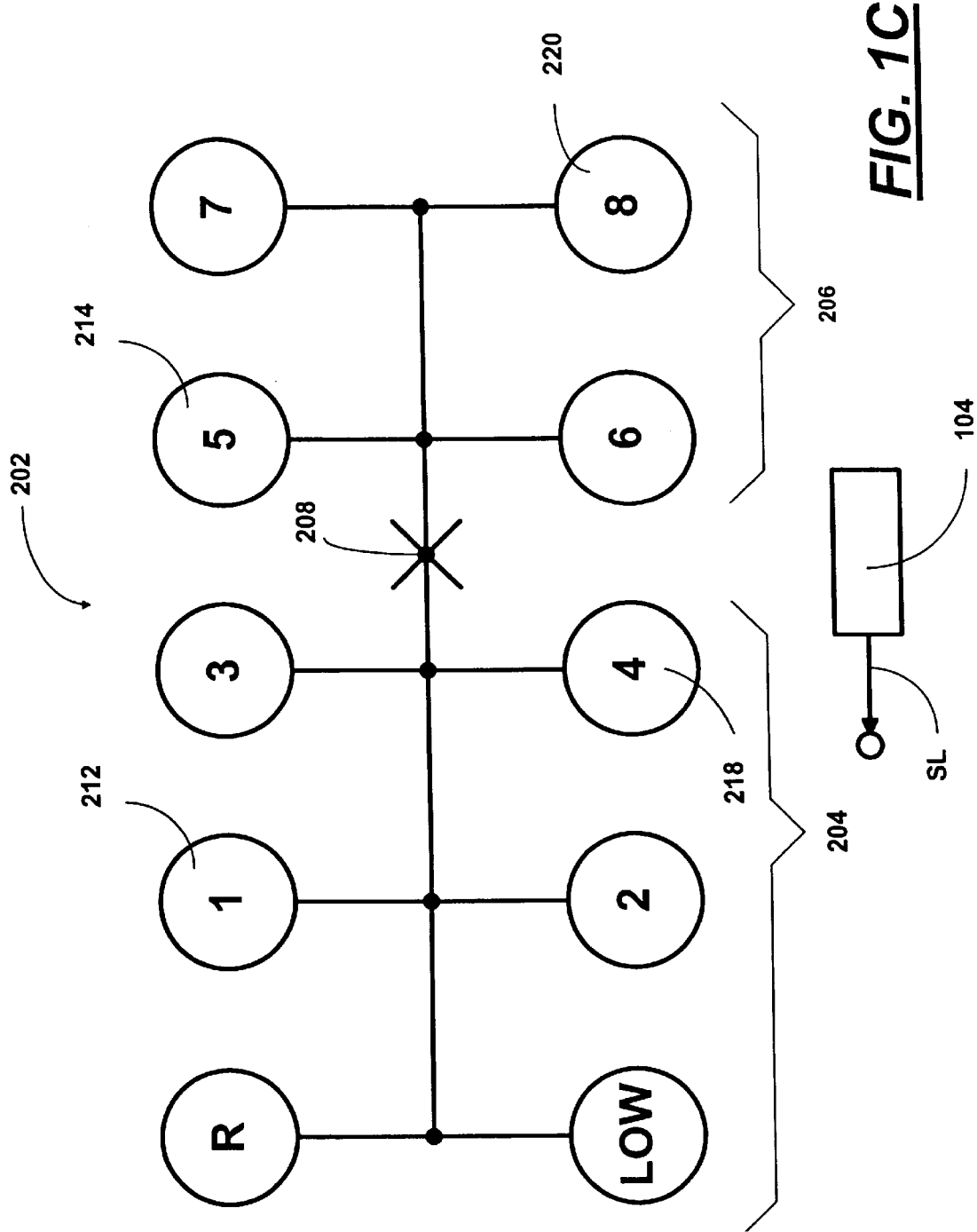
FIG. 1C is a schematic illustration of a "double-H" type shift pattern for the transmission of FIG. 1.

A "repeat-H" type shift pattern for compound range-type transmission 10 is schematically illustrated in FIG. 1B. Selection and/or preselection of low or high range operation of the transmission 10 is accomplished using an operator-actuated switch or button 96, which is usually located at the shift lever 72. A "double-H" type shift pattern 202 for transmission 10 is illustrated in FIG. 1C. Shift pattern 202 includes a low range section 204 and a high range section 206. As the shift lever passes a point 208, such motion is sensed or activates a switch, causing a range section shift.

Although the range-type auxiliary section 14 is illustrated as a two-speed section utilizing spur- or helical-type gearing, it is understood that the present invention is also applicable to range-type transmissions utilizing combined splitter/range-type auxiliary sections having three or more selectable range ratios and/or utilizing planetary-type gearing. Also, as indicated above, any one or more of clutches 60, 62 or 64 may be of the synchronized jaw clutch type. Likewise, transmission sections 12 and/or 14 may be of the single countershaft type.

Main transmission section 12 is controlled by axial movement of at least one shift rail or shift shaft contained within shift bar housing 70 and controlled by operation of shift lever 72. As is known, shift lever 72 may be mounted directly to or remotely from the transmission. Devices of this type are well known in the prior art and may be seen by reference to U.S. Pat. No. 4,621,537, the disclosure of which is incorporated herein by reference. The range section is controlled by operation of button 96 or range switch RS having a low or high position for "repeat-H" shifting, or by a sensor or switch sensing passage across point 208 for "double-H" shifting, as is well known in the prior art (see U.S. Pat. Nos. 5,193,410; 5,904,635 and 5,231,895. Shift bar housing 70 may be a conventional multiple shift rail, well known in the prior art, as may be seen by reference to U.S. Pat. Nos. 4,782,719; 4,738,863; 4,722,237 and 4,614,126, the disclosures of which are incorporated herein by reference, or a single shift shaft, also well known in the art.

A speed sensor 100 is provided to sense the rotational speed of the output shaft and to provide a signal OS, which is indicative of vehicle speed. The position (high or low) of the range switch 96 is provided by a sensor 102, which provides a signal RS.

A sensor 104 will provide a signal SL indicative of the position of the shift lever 72 in the shift pattern. One embodiment of sensors of this type is illustrated in U.S. Pat. Nos. 5,743,143 and 5,950,491, the disclosures of which are incorporated herein by reference.

Figure 1D:
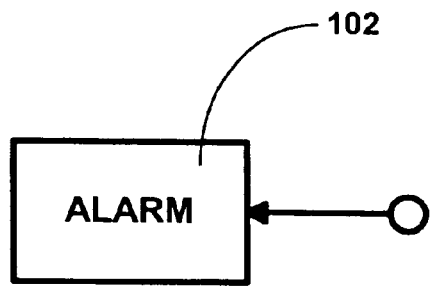
FIG. 1D is a schematic illustration of a range control system for the transmission of FIG. 1 according to the present invention.
Figure 1D:
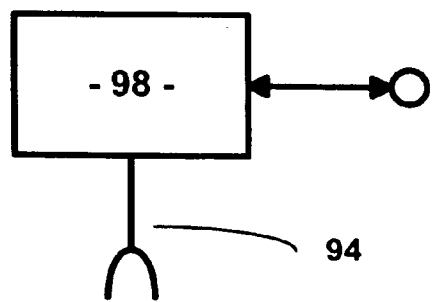
Figure 1D:
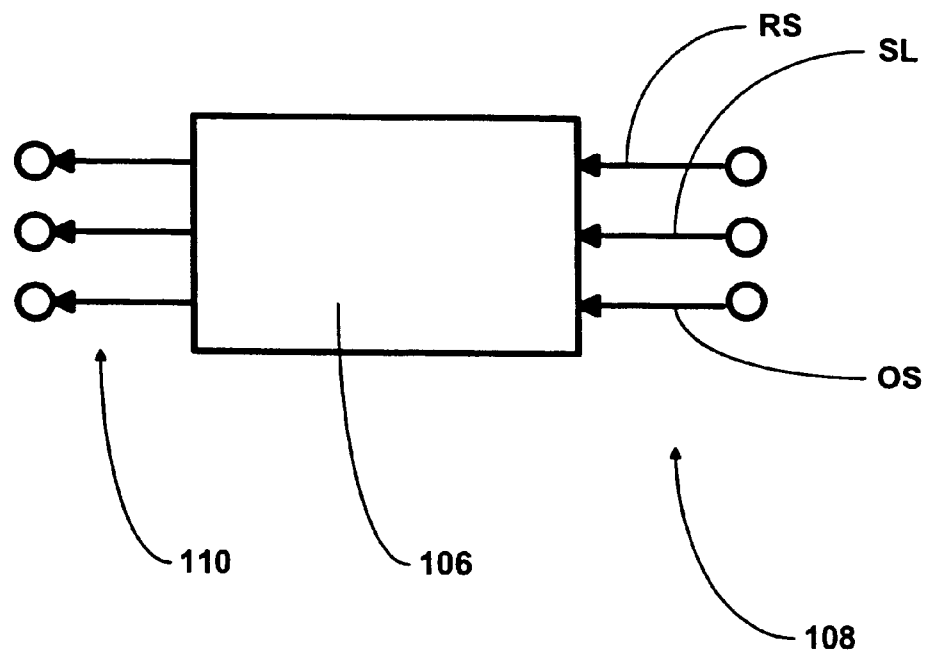

Referring to FIG. 1D, a microprocessor-based controller 106 receives inputs 108 and processes same according to logic rules to issue command output signals 110 to various system actuators. The inputs 108 will include at least the signals RS, SL and OS and command output signals will be issued to at least range actuator 96 and to an alarm device 112. Preferably, range actuator 98 will have a mode of operation wherein its position (high or low range) will be determined by the controller, regardless of the position of the range switch 96 (see, for example, U.S. Pat. No. 5,893,292).

Signals may travel by a vehicle data link, such as an SAE J-1922 or SAE J-1939 compliant data link, and the controller 106 may be the engine or the transmission controller.

The operator uses the shift lever 72 to engage main section ratio gears. The driver or operator is solely in control of engaging and disengaging main section ratios. The driver also selects range section ratios. By moving to shift pattern position 210 in shift pattern 200, or to shift pattern position 212 or 214 in shift pattern 202, jaw clutch 62 is moved rightwardly to clutch 1st/5th ratio gear 54 to mainshaft 28. In transmission 10, if the operator manually moves to the 210 position (or 212 or 214 positions for a "double-H" shift pattern 202), gear 54 is manually engaged and the overall transmission ratio (input shaft speed/output shaft speed) will be first ratio (usually about 8 to 10:1 in a typical heavy-duty vehicle compound transmission) or fifth ratio (usually about 2.5 to 3.5:1), depending upon whether low or high range is engaged.

Similarly, if the driver moves to shift position 216 in shift pattern 200, or to either shift position 218 or 220 in shift pattern 202, clutch 60 will cause input gear 24 to be clutched to mainshaft 28 and the overall transmission ratio will be either fourth (about 2 to 3:1) or eighth (about 1 to 0.90:1), depending upon the engaged range ratio.

Under normal circumstances, the engaged range ratio and, thus, the engaged overall transmission ratio, will be that selected by the operator using the switch 96, or by operating in the left, 204, or right, 206, portions of shift pattern 202.

If, however, the operator attempts to select an overall ratio which is unacceptable and/or will result in catastrophic failure if engaged at current vehicle speed, the system of the present invention will determine the most or a more acceptable overall ratio obtainable with the manually engaged main section gear and will shift the range section accordingly.

A target transmission ratio is unacceptable, i.e., not allowable, if the expected engine speed at engagement thereof ($ES=OS \times GR_T$) under existing or expected vehicle conditions is greater than a maximum engine speed reference value ($ES_{MAX}$) or less than a minimum engine speed reference value ($ES_{MIN}$). Existing vehicle operating conditions will include current vehicle speed, as well as estimates of vehicle speed at time of completion of a shift. If allowable, if $ES_{MAX} > ES > ES_{MIN}$, then the control will allow the selected range ratio to be or remain engaged. See U.S. Pat. No. 4,361,060 for a discussion of allowable engine speeds.

By way of example, if the operator manually shifts to shift pattern 200 position 210 with range-low selected, or to the 212 position in "double-H" shift pattern 202, and vehicle speed is in excess of 20 or 30 MPH, allowing first gear ratio to be engaged probably would result in severe shocks and/or severe damage to the transmission. The system would determine the expected engine speed ($ES=OS \times GR_T$) in the operator-selected target ratio (in this example, first), would determine that engaging first ratio under existing vehicle operating conditions is not allowable and, regardless of driver intent, would cause range-high to be selected (ie., cause fifth gear ratio to be engaged) and would sound an alarm 102 to inform the operator that the proper range ratio position should be selected.

With many prior art transmissions, engaging first under high speed conditions was difficult or impossible, and clutch tooth raking would have warned the driver not to continue with his intended shift. However, in transmissions equipped with improved and/or enhanced synchronizers and/or shift assist systems, such shifts may be relatively easily completed.

Alternatively and/or additionally, an attempt to engage eighth under very low speed conditions by shifting to shift pattern 200 position 216 with range-high selected, or to shift to shift pattern 202 position 220, is also unacceptable, as the engine will be stalled. In such condition, if the operator does attempt to complete such a shift, the controller will cause the range to be shifted to range-low and the alarm will sound.

An alternate ratio $GR_{ALT}$ is acceptable or more acceptable than the target ratio $GR_T$ if the amount by which ES exceeds $ES_{MAX}$, or by which $ES_{MIN}$ exceeds ES, in the alternate ratio is less than in the target ratio.

Under such conditions, the controller will cause an automatic shift to the non-selected range ratio, contrary to the position of the range selector 96, or shift lever in a "double-H" shift pattern, and will cause a visual or audible alarm 102 to be activated. Preferably, the alarm 102 will remain active, and the range will remain in the non-selected range ratio, regardless of selector position, vehicle speed, etc., until the operator manually selects a shift to the appropriate range position.

Figure 3A:
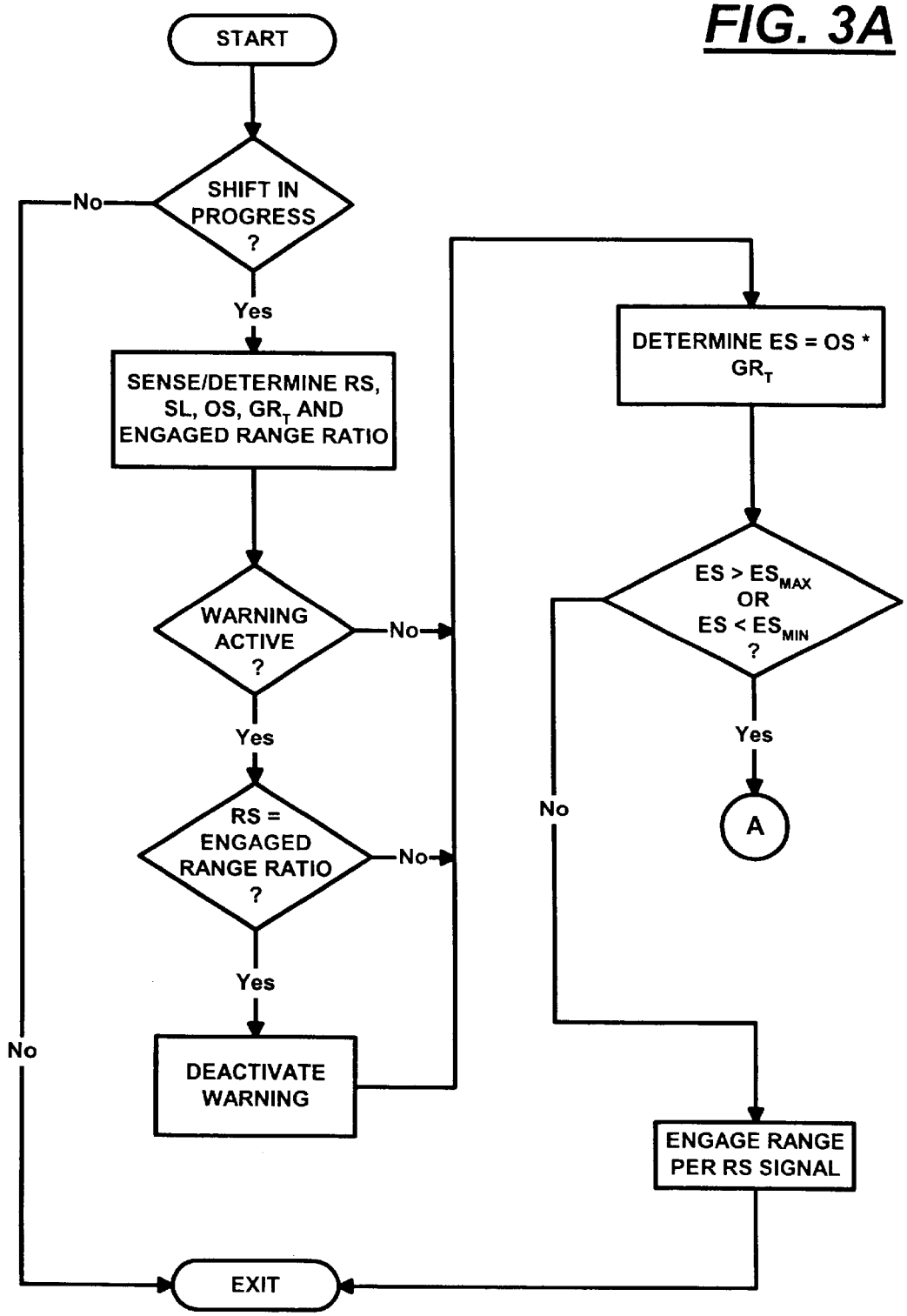
FIGS. 3A and 3B are schematic illustrations, in flow chart format, of the control logic utilized by the range shift control of the present invention.
Figure 3B:
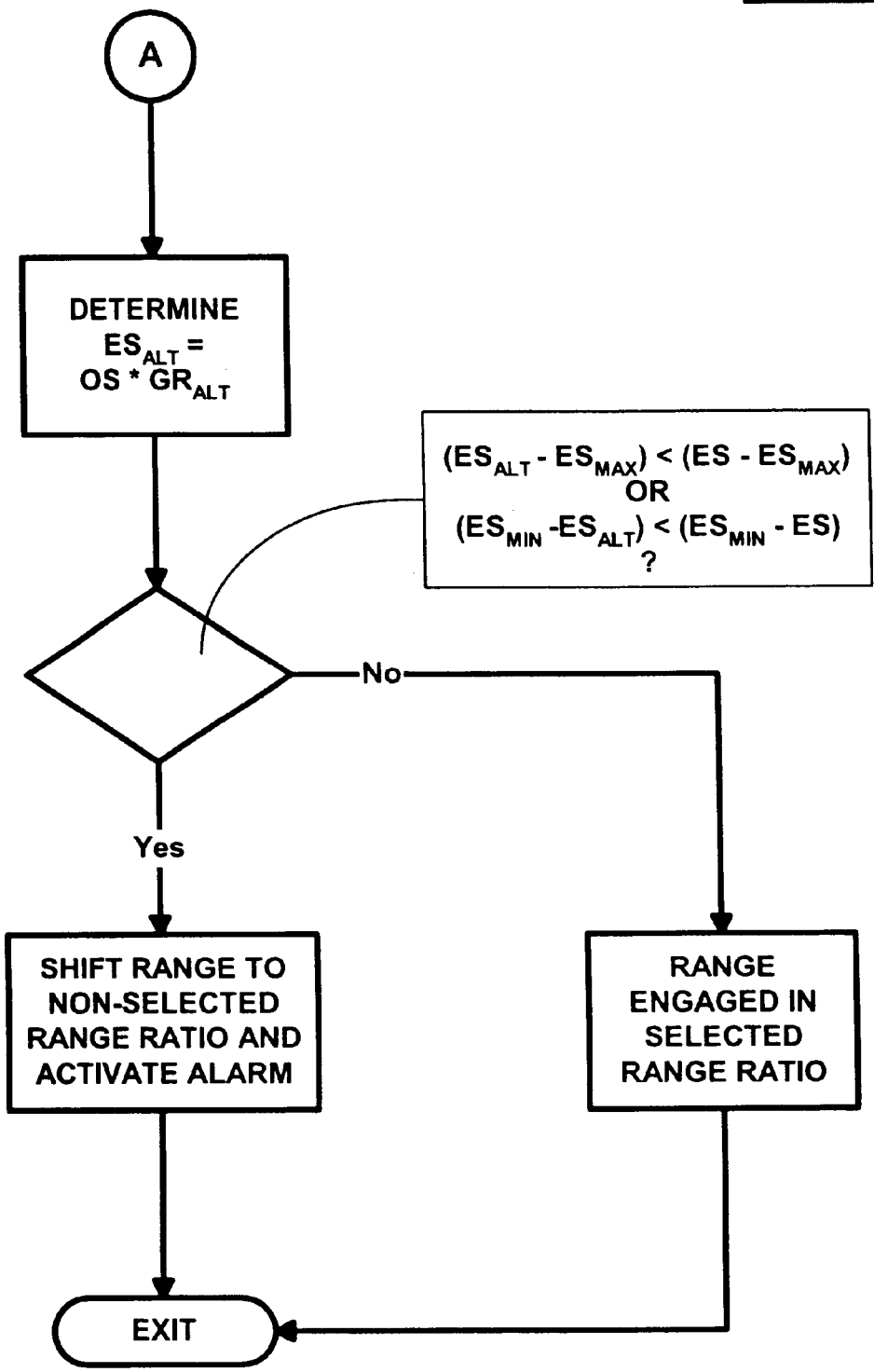

The operation of the range control of the present invention may be seen by reference to the flow chart of FIG. 3.

Figure 2:
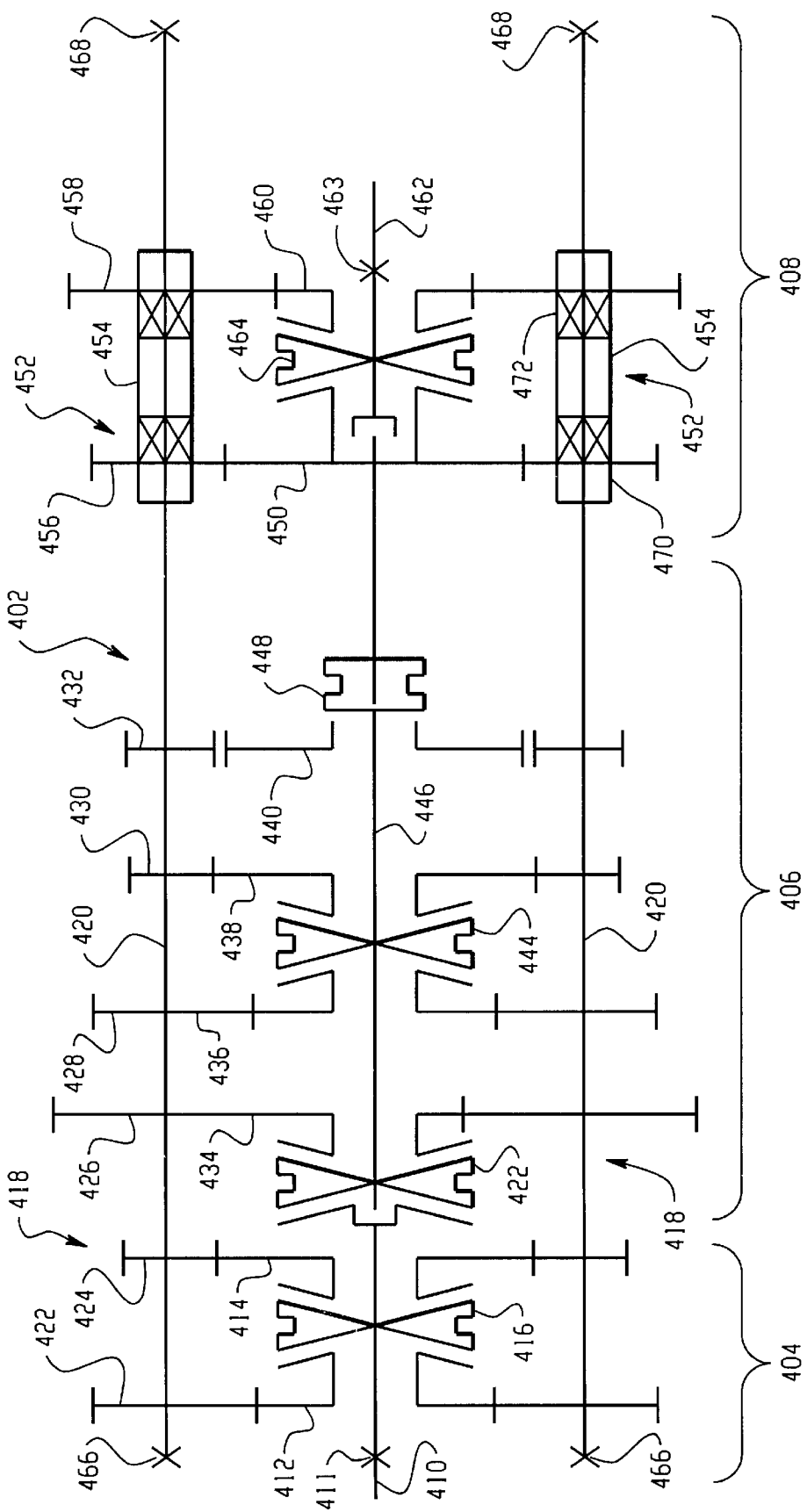
FIG. 2 is a schematic illustration of a compound transmission of the combined range-and-splitter type utilizing enhanced synchronizer clutches and the range control system of the present invention.
Figure 2A:
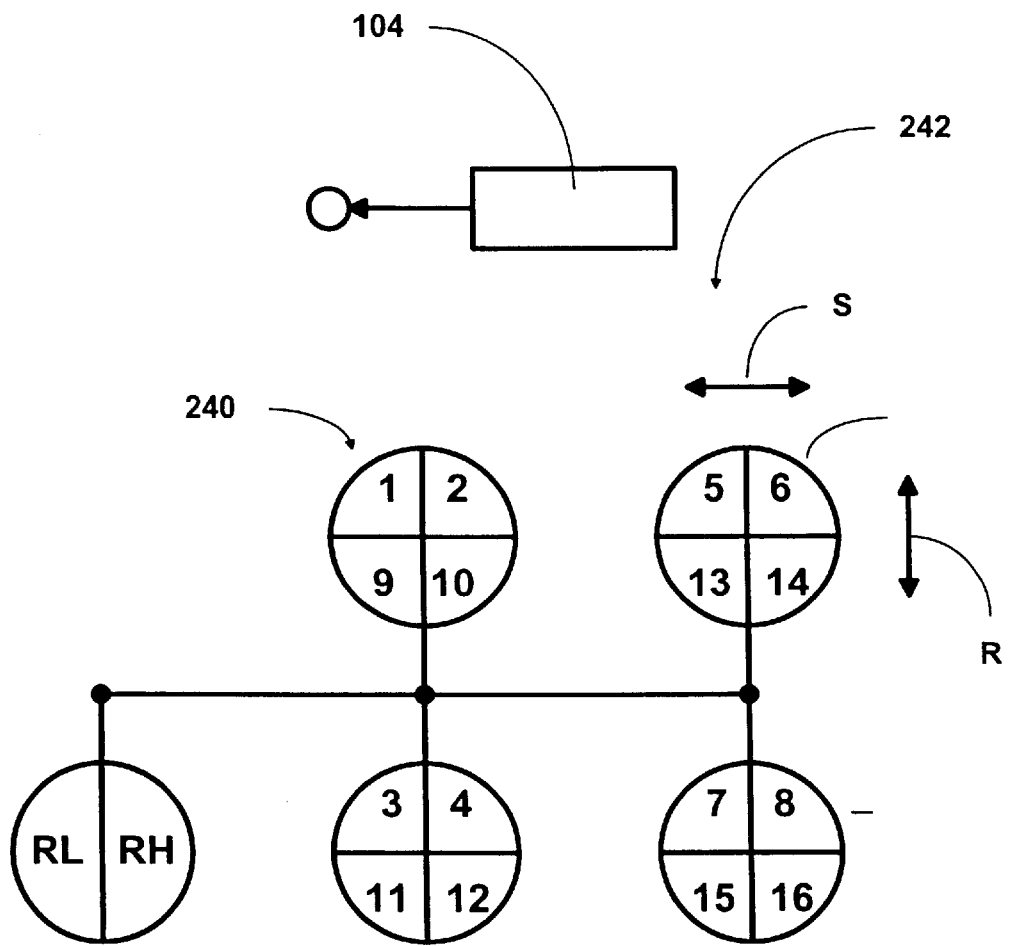
FIG. 2A is a schematic illustration of a "repeat-H" type shift pattern for the transmission of FIG. 3.
Figure 2B:
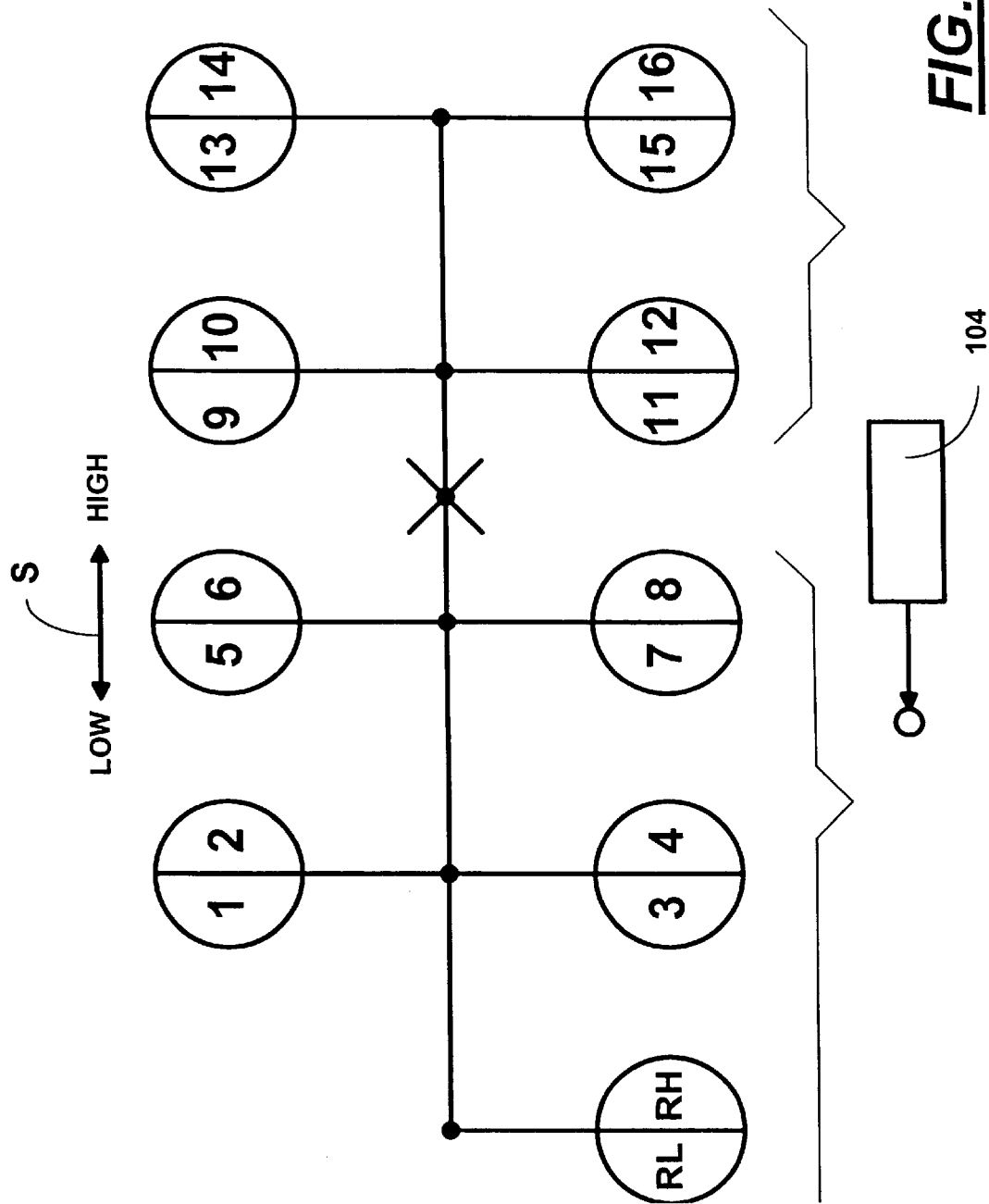
FIG. 2B is a schematic illustration of a "double-H" type shift pattern for the transmission of FIG. 2.

FIGS. 2, 2A and 2B illustrate, respectively, a combined splitter-and range-type transmission, and "repeat-H" and "double-H" shift patterns therefor, which advantageously utilizes the range control of the present invention.

Transmission 402 is a "2×4×2" type 16-speed transmission having a two-speed splitter section 404, a four-forward-speed main section 406 and a two-speed range section 408, all connected in series. The gearing of transmission 402 may be helical.

Briefly, an input shaft 410 is supported in the transmission housing forward wall (not shown) by bearing 411 and is surrounded by two input gears 412 and 414, a selected one of which is clutched to the input shaft by synchronized clutch 416 to provide a two-speed splitter input section. Front countershaft assemblies 418 each include a countershaft 420 carrying countershaft gears 422, 424, 426, 428, 430 and 432. Gears 422 and 424 are constantly meshed with the input gears 412 and 414. In main section 416, gears 426, 428, 430 and 432 are constantly meshed with mainshaft gears 434, 436, 438 and a reverse idler (not shown) meshed with reverse mainshaft gear 440. Double-acting, synchronized jaw clutches 442 and 444 are provided on mainshaft 446 to clutch the mainshaft 446 to a selected one of the input shaft 410 or mainshaft gears 434, 436 or 438. Non-synchronized clutch 448 is used to clutch the reverse mainshaft gear 440 to the mainshaft 446.

The rearward end of mainshaft 446 extends into the two-speed range section 408 and carries gear 450 fixed for rotation therewith. A pair of auxiliary section countershaft assemblies 452 each include an auxiliary section countershaft 454 carrying two auxiliary section countershaft gears 456 and 458. Gear 456 is constantly meshed with auxiliary input gear 450, while gear 458 is constantly meshed with an output gear 460 surrounding output shaft 462. Output shaft 462 is supported in the housing rear end wall (not shown) by bearing(s) 463. A two position, synchronized range clutch 464 is carded by the output shaft 462 and is utilized to clutch either output gear 460 or mainshaft 446 ot the output shaft 462.

Bearings 466 and 468 are used to rotatably mount the front countershafts 420 to the forward and rearward end walls (not shown) of a transmission housing. Auxiliary countershafts 454 are generally tubular members telescopically surrounding the rear ends of the front countershafts and may be supported thereon by needle bearings 470 and 472 or the like. The mainshaft is supported by the input shaft and/or output shaft.

The synchronized jaw clutches 442 and 444 are preferably of the enhanced type and/or operated by boost or assist mechanisms, allowing almost any attempted shift to be relatively easily completed.

According to the present invention, shift pattern position 240 in "repeat-H" shift pattern 242 offers four possible ratios, first, second, ninth and tenth, when the driver manually engages gear 438 to mainshaft 446. By controlling both the splitter and range section actuators, the system controller will have four potential ratios to select as a more or most acceptable ratio if the driver-selected target ratio is unacceptable.

By way of example, if the target ratio is first, which is not acceptable, but second is determined to be acceptable, a simple automatic shift from splitter-low to splitter-high will be implemented and the range section will be or remain engaged in the manually selected range ratio.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling range section shifting in a manually shifted, vehicular compound transmission having a manually shifted main section connected in series with a range section having a high range ratio and a low range ratio, said transmission having an input shaft for connection to an engine having a highest ($ES_{MAX}$) and a lowest ($ES_{MIN}$) allowable engine speed, said main transmission section having a plurality of main section ratio positions (1/5, 2/6, 3/7, 4/8) available in both high and low range, a sensor for sensing a current position of a shift selector (72) manually movable in a shift pattern to selectively engage and disengage main section ratios, a range section actuator for shifting the range section in response to command signals, a manually operated range ratio selection means for selecting engagement of one of the high and low range ratios, a speed sensor for sensing vehicle speed and providing a signal indicative thereof, and a controller for receiving input signals, including said signals indicative of the current position of the shift selector and of vehicle speed, and processing same according to predetermined logic rules to issue command output signals to system actuators, including said range section actuator, said method including the steps of:

(i) determining vehicle speed, position of the range ratio selection means, position of the shift selector, and target ratio ($GR_T$);

(ii) determining if said target ratio is acceptable under existing vehicle operating conditions;

(iii) if said target ratio is acceptable under existing vehicle operating conditions, allowing the range section to be engaged in the range ratio indicated by the range ratio selection means; and (iv) if said target ratio is not acceptable under existing vehicle operating conditions, (a) determining an alternative overall transmission ratio ($GR_{ALT}$) obtained by engaging the main section in the operator-selected main section ratio position thereof and engaging the range section in the ratio not indicated by the range ratio selection means, (b) determining if the alternate overall ratio is more acceptable than the target ratio under existing vehicle operating conditions, and (c) if the alternate overall ratio is more acceptable than the target ratio under existing vehicle operating conditions, causing the range section to be engaged in said ratio not indicated by the range ratio selection means.

2. The method of claim 1 wherein step (iv)(c) includes activating an alarm.

3. The method of claim 1 wherein an overall transmission ratio (GR) is unacceptable if at least one of (i) engine speed in the ratio under existing vehicle operating conditions is greater than said maximum engine speed (($OS \times GR$)>$ES_{MAX}$), or (ii) engine speed in the ratio under existing vehicle operating conditions is less than said minimum engine speed (($OS \times GR$)<$ES_{MIN}$).

4. The method of claim 2 wherein an overall ratio (GR) is unacceptable if at least one of (i) engine speed in the ratio under existing vehicle operating conditions is greater than said maximum engine speed (($OS \times GR$)>$ES_{MAX}$), or (ii) engine speed in the ratio under existing vehicle operating conditions is less than said minimum engine speed (($OS \times GR$)<$ES_{MIN}$).

5. The method of claim 3 wherein said alternate overall ratio ($GR_{ALT}$) is more acceptable than said target ratio ($GR_T$) if one of (i)(a) $ES>ES_{MAX}$ and (b) (($OS*GR_T$)−$ES_{MAX}$)< (($OS*GR_{ALT}$)−$ES_{MAX}$) and (ii)(a) $ES<ES_{MIN}$ and (b) ($ES_{MIN}$−($OS*GR_{ALT}$))<($ES_{MIN}$−($OS*GR_T$)) is true.

6. The method of claim 4 wherein said alternate overall ratio ($GR_{ALT}$) is more acceptable than said target ratio ($GR_T$) if one of (i)(a) $ES>ES_{MAX}$ and (b) (($OS*GR_T$)−$ES_{MAX}$)< (($OS*GR_{ALT}$)−$ES_{MAX}$) and (ii)(a) $ES<ES_{MIN}$ and (b) ($ES_{MIN}$−($OS*GR_{ALT}$))<($ES_{MIN}$−($OS*GR_T$)) is true.

7. The method of claim 1 wherein said shift selector is a shift lever (72) movable in a "repeat-H" shift pattern (200) and said range ratio selection means is a switch (96) attached to said shift lever.

8. The method of claim 1 wherein said shift selector is a shift lever (72) movable in a "double-H" shift pattern (202)

having a low range section (204) and a high range section (206), and said range ratio selection means is a device for sensing movement of said shift lever in said shift pattern between said low and high range sections thereof.

9. A system for controlling range section shifting in a manually shifted, vehicular compound transmission (10) having a manually shifted main section (12) connected in series with a range section (14) having a high range ratio and a low range ratio, said transmission having an input shaft (16) for connection to an engine (E) having a highest ($ES_{MAX}$) and a lowest ($ES_{MIN}$) allowable engine speed, said main transmission section having a plurality of main section ratio positions (1/5, 2/6, 3/7, 4/8) available in both high and low range, a sensor (104) for sensing a current position of a shift selector (72) manually movable in a shift pattern (200, 202) to selectively engage and disengage main section ratios, a range section actuator (98) for shifting the range section in response to command signals, a manually operated range ratio selection means (96, 208) for selecting engagement of one of the high and low range ratios, a speed sensor (100) for sensing vehicle speed and providing a signal (OS) indicative thereof, and a controller for receiving input signals, including said signals indicative of the current position of the shift selector (SL) and of vehicle speed, and processing same according to predetermined logic rules to issue command output signals to system actuators, including said range section actuator, said system characterized by said logic rules, including rules for:

(i) determining vehicle speed, position of the range ratio selection means, position of the shift selector, and target ratio ($GR_T$);

(ii) determining if said target ratio is acceptable under existing vehicle operating conditions ($ES_{MAX}$>ES>$ES_{MIN}$);

(iii) if said target ratio is acceptable under existing vehicle operating conditions, allowing the range section to be engaged in the range ratio indicated by the range ratio selection means; and (iv) if said target ratio is not acceptable under existing vehicle operating conditions, (a) determining an alternative overall transmission ratio ($GR_{ALT}$) obtained by engaging the main section in the operator-selected ratio osition thereof and engaging the range section in the ratio not indicated by the range ratio selection means, (b) determining if the alternate overall ratio is more acceptable than the target ratio under existing vehicle operating conditions, and (c) if the alternate overall ratio is more acceptable than the target ratio under existing vehicle operating conditions, causing the range section to be engaged in said ratio not indicated by the range ratio selection means.

10. The system of claim 9 wherein logic rule (iv)(c) includes activating an alarm.

11. The system of claim 9 wherein an overall transmission ratio (GR) is unacceptable if at least one of (i) engine speed in the ratio under existing vehicle operating conditions is greater than said maximum engine speed ((OS×GR)>$ES_{MAX}$), or (ii) engine speed in the ratio under existing vehicle operating conditions is less than said minimum engine speed ((OS×GR)<$ES_{MIN}$).

12. The system of claim 10 wherein an overall ratio (GR) is unacceptable if at least one of (i) engine speed in the ratio under existing vehicle operating conditions is greater than said maximum engine speed ((OS×GR)>$ES_{MAX}$), or (ii) engine speed in the ratio under existing vehicle operating conditions is less than said minimum engine speed ((OS×GR)<$ES_{MIN}$).

13. The system of claim 11 wherein said alternate overall ratio ($GR_{ALT}$) is more acceptable than said target ratio ($GR_T$) if one of (i)(a) ES>$ES_{MAX}$ and (b) (($OS*GR_T$)–$ES_{MAX}$)<(($OS*GR_{ALT}$)–$ES_{MAX}$) and (ii)(a) ES<$ES_{MIN}$ and (b) ($ES_{MIN}$–($OS*GR_{ALT}$))<($ES_{MIN}$–($OS*GR_T$)) is true.

14. The system of claim 12 wherein said alternate overall ratio ($GR_{ALT}$) is more acceptable than said target ratio ($GR_T$) if one of (i)(a) ES>$ES_{MAX}$ and (b) (($OS*GR_T$)–$ES_{MAX}$)<(($OS*GR_{ALT}$)–$ES_{MAX}$) and (ii)(a) ES<$ES_{MIN}$ and (b) ($ES_{MIN}$–($OS*GR_{ALT}$))<($ES_{MIN}$–($OS*GR_T$)) is true.

15. The system of claim 9 wherein said shift selector is a shift lever (72) movable in a "repeat-H" shift pattern (200) and said range ratio selection means is a switch (96) attached to said shift lever.

16. The system of claim 9 wherein said shift selector is a shift lever (72) movable in a "double-H" shift pattern (202) having a low range section (204) and a high range section (206), and said range ratio selection means is a device for sensing movement of said shift lever in said shift pattern between said low and high range sections thereof.

* * * * *